United States Patent Office 2,934,001
Patented Apr. 26, 1960

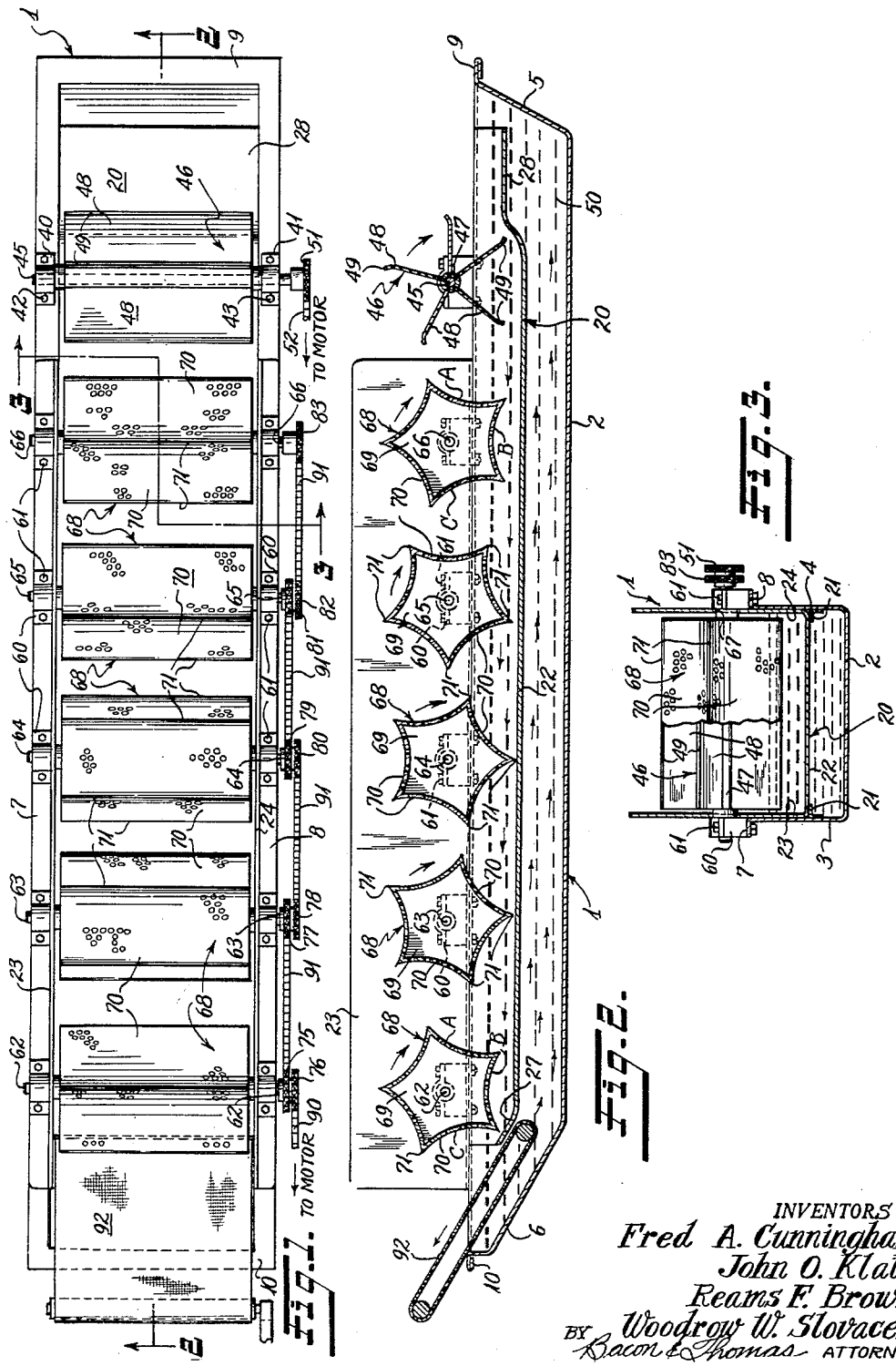

2,934,001

FRY VAT

Fred A. Cunningham, John O. Klatt, Reams F. Brown, and Woodrow W. Slovacek, San Antonio, Tex., assignors to The Facs Manufacturing Company, Inc., San Antonio, Tex., a corporation of Texas Application September 10, 1957, Serial No. 683,044

8 Claims. (Cl. 99—406)

This invention relates generally to a novel fry vat and more particularly to a vat for the continuous deep-frying of various types of foods.

It is a primary object of the present invention to provide a vat wherein food is readily conveyed from a point of introduction to a point of automatic removal, and wherein it is thoroughly exposed to the frying liquid employed by being alternately submitted to washing and dunking actions during its course through the vat.

Another primary object is to provide a continuous fry vat wherein any congestion of the food at the point of introduction is precluded and wherein the food is conveyed through the vat without getting clogged or trapped in the structure or mechanism.

Another object is to provide a vat wherein food is cooked quickly and uniformly to produce a uniform product.

A further object is to provide a vat which is sturdily constructed, economical to manufacture, simple and efficient in operation, and readily assembled and disassembled for cleaning and repairs.

Other objects and advantages will be apparent from the following description, taken in conjunction with the accompanying drawings in which:

Fig. 1 is a top plan view of a fry vat incorporating the principles of the present invention;

Fig. 2 is a sectional view taken along the line 2—2 of Fig. 1; and

Fig. 3 is a sectional view taken along the line 3—3 of Fig. 1.

Referring now in detail to the drawings, the vat 1 is preferably an elongated rectangular-shaped tank including a bottom 2, side walls 3 and 4, and generally inclined end walls 5 and 6. Flanges 7 and 8 extend outwardly from the upper edges of side walls 3 and 4, and flanges 9 and 10 extend outwardly from the upper edges of end walls 5 and 6.

A baffle member 20 is mounted in the vat 1 by means of flanges 21 extending laterally inwardly from the opposed side walls 3 and 4 at a suitable height. Baffle member 20 includes a bottom 22 and side walls 23 and 24 which extend upwardly along the inner surface of side walls 3 and 4 to a height which will be described hereinafter. One end of the baffle 20, adjacent the end wall 6 of vat 1, is inclined slightly upwardly, as at 27, and the opposite end, adjacent end wall 5 of vat 1, includes an extended raised portion 28 for a purpose which will appear hereinafter.

Opposed bearing blocks 40 and 41 are mounted by bolts or cap screws 42 and 43 on flanges 7 and 8 just inwardly of the inner end of raised portion 28. A shaft 45, journalled in bearing blocks 40 and 41, serves to mount a paddle wheel 46. The paddle wheel 46 includes a central sleeve 47, fixedly mounted on the shaft 45, and a plurality of radially extending vanes 48 having their outer edges 49 bent slightly inwardly. Power is supplied to the paddle wheel 46 from a suitable source (not shown) at variable speeds through a chain drive 52, which is connected to a gear 51 at one end of the shaft 45. Thus, it will be seen that liquid 50 within the vat 1 may be propelled over the baffle member 20 toward the wall 6, returning under the baffle member to the wall 5. It will further be seen that at this point the speed of the flow increases, since the raised portion 28 of baffle member 20 provides a constricted area of rapid flow thereabove. This feature is very advantageous, in that the food introduced at this point is swept rapidly away from the point of introduction and therefore does not become entangled or congested.

A plurality of drums 68 are provided, each including end walls 69 and perforated side walls 70. The side walls 70 of each drum are preferably of equal dimensions and bent longitudinally to form concave outer surfaces. In practice, the edges 71 where adjacent side walls 70 intersect are fourteen inches apart, and a concavity two inches in depth is employed to provide a pocket-like configuration between said edges for the reception of food particles.

Each drum 68 is provided with a pair of axially extending stub shafts, suitably secured to the end walls 69 thereof, the respective pairs of stub shafts being indicated by the numerals 62, 63, 64, 65, and 66 in the drawings. Stub shafts 62–66 extend through apertures 67 in baffle walls 23 and 24 and are journalled in bearing blocks 60 which are suitably mounted in oppositely disposed, transversely aligned pairs in spaced relation along flanges 7 and 8. Bearing blocks 60 may be secured in position by bolts or cap screws 61.

The drums 68 are mounted a sufficient distance from the baffle member 20 to allow a slight clearance of approximately one-half inch between the edges 71 (at their lowest point of rotation) and the baffle member 20. The level of the liquid in the tank is maintained at a sufficient height so that each side wall 70 is completely immersed when rotated to the position shown at B in Fig. 2. Gates or openings (not shown) may be provided in one or both end walls 69 of each drum 68 to facilitate cleaning.

Stub shafts 62–66 extend laterally of the vat 1 on the same side thereof as the sprocket 51. The extending end of the respective stub axle 62 is provided with a pair of sprockets 75 and 76. Similarly, pairs of sprockets 77 and 78, 79 and 80, and 81 and 82 are provided on the extending ends of the respective stub axles 63, 64, and 65. A single sprocket 83 is similarly provided on the extending portion of the respective stub axle 66. The extending portions of the various axles may extend past the respective sprockets and have their outer ends journalled in bearing blocks (not shown) suitably mounted on an extension of flange 8.

A chain 90 is provided to drive stub axle 62 through sprocket 76. This drive is transmitted to the other drums by a plurality of chains 91 connecting sprocket 75 with sprocket 77, sprocket 78 with sprocket 80, sprocket 79 with sprocket 81, and sprocket 82 with sprocket 83. The size of the various sprockets may be varied as desired to effect rotation of the drums at different speeds, as will be indicated hereinafter. It is also preferable that the drive applied through chain 90 be variable so that the speed of rotation of all of the drums can be varied as conditions require. In all instances, however, it is preferable that they turn at a rate of speed much slower than the speed of flow of liquid 50. Thus, food from the point of introduction in vat 1 is swept by the flow of liquid 50 against one of the concave side walls 70 in the position shown at A, where it is positively restrained and thoroughly washed and permeated by the cooking liquid. As the drum slowly rotates, the food, caught in the pocket like concavity of the side wall, is dunked entirely beneath the liquid level, the wall assuming the position indicated by the letter B. As the slow rotation continues, the wall assuming the position illustrated by the letter C, the food material is freed and once again subjected to the propelling action of the liquid flow which carries it against the side wall thereof of the next succeeding drum 68.

An endless conveyor 92 formed of any suitable perforated material, such as woven stainless steel wire or the like, is provided at the far end of vat 1, and driven by any suitable means (not shown). As food leaves the last drum 68 it is carried by the flow of liquid onto conveyor 92 and thereby removed from the vat 1. The liquid 50 at the same time is strained through the conveyor 92 to remove food particles or the like. As will be seen from Fig. 2, baffle side walls 23 and 24 extend upwardly to a greater height than drums 68 and thus serve to prevent the food from being ejected over the side of the vat 1. It should also be noted that a suitable cover (not shown) may be employed to reduce heat loss, and trap escaping vapors.

In practice, heat is applied under the vat bottom 2 by any suitable means (not shown) to maintain the temperature of the cooking oil at about 390° F. It will be understood, however, that such heat may be applied in a number of different ways familiar to those skilled in the art, as for example, through the utilization of immersed electrical heating elements, or steam coils.

The paddle wheel is driven at a substantial speed to effect rapid circulation of the liquid, and the drums are driven at a materially lower speed, for example, between 2 and 2½ r.p.m. Both of the above speeds may, however, vary in accordance with the substance being cooked, the temperature employed, etc. Further, with sprockets of suitable size the drums nearest the point of introduction can be driven at a faster rate of speed than those nearer the point of removal. Thus, congestion of the uncooked mass at the point of introduction is reduced.

It will thus be seen that the invention described herein is well adapted to attain the objectives stated hereinabove, and those implicit in the above description. It is, however, to be understood that numerous changes and modifications in structure, configurations and dimensions may be made without departing from the principle of the invention or the scope of the annexed claims.

We claim:

1. Cooking apparatus, comprising: an elongated tank; a horizontal baffle member within said tank between the opposite ends thereof; a paddle wheel mounted above said baffle member adjacent one end of said tank and adapted to cause liquid flow over said baffle to the opposite end of said tank for return under said baffle, said baffle including a raised portion between said one end of said tank and said paddle wheel to decrease the area of flow at this point and increase the rate of flow for the rapid conveyance of solids introduced at said one end of the tank; a movable restraining member interposed in the stream of said liquid flow downstream of said paddle wheel, said restraining member being perforated to permit passage of said liquid therethrough while restraining said solids; means for moving said restraining member to release said solids for movement with said stream; and means for removing said solids from said tank at the opposite end thereof.

2. Cooking apparatus, comprising: a tank for holding a body of liquid; a horizontal baffle member within said tank; means for causing circulating stream flow of said body of liquid across said baffle member from one end thereof to the other end for return under said baffle member from said other end to said one end, a laterally disposed portion of the upper surface of said baffle member being raised above the level of the main portion of said baffle member to decrease the area of flow and increase the rate of flow over said raised portion; and means for introducing solids into said tank from a point above said raised portion, whereby said solids are rapidly conveyed from the point of introduction.

3. A drum for restraining and dunking solid materials in a bath of flowing liquid, comprising: a pair of opposed vertical end walls mounted for rotation about a horizontal axis; and side wall means substantially enclosing the space between said end walls, said side wall means consisting of a plurality of interconnected wall portions arranged between said end walls in generally tangential relation with respect to said axis and radially spaced therefrom, said wall portions each being slightly depressed inwardly to provide a horizontally disposed, outwardly facing concavity and each being perforated throughout substantially the entire surface thereof.

4. Cooking apparatus, comprising: a tank; means for causing circulating stream flow of a liquid in said tank to convey solids along the path of said stream; a drum mounted with its lower portion immersed in said liquid for rotation about a horizontal axis, said drum having an outwardly concave side wall surface interposed across said stream on the upstream side of said axis to receive said solids, said surface being perforated to permit passage of said liquid therethrough while restraining said solids; and means for rotating said drum at a peripheral speed slower than the speed of said stream flow, said drum being rotated in the direction which moves said surface under said liquid to the downstream side of said drum, whereby said solids are consecutively held against stream flow, submerged in said liquid, and released for movement with said stream.

5. Cooking apparatus, comprising: a tank; means for causing circulating stream flow of a liquid within said tank to convey solids along the path of said stream; a drum partially immersed in said liquid across the path of said flow, said drum being mounted for rotation about a horizontal axis and having a perforated side wall portion on one side of said axis defined by raised edges projecting radially outward therefrom and extending longitudinally across the outer surface of said drum; and means for rotating said drum about said axis in the direction which effects downstream movement of the lowermost portion of said drum, the rotation of said drum being at a peripheral speed less than the speed of said flow, whereby said side wall portion moves from a generally vertical, partially immersed position on the upstream side of said drum to a generally horizontal, fully immersed position at the bottom of said drum and then to a generally vertical, partially immersed position on the downstream side of said drum to thereby convey solids received on the upstream side of said drum under the surface of said liquid for discharge on the downstream side of said drum.

6. Cooking apparatus, comprising: a tank; means for causing circulating stream flow of a liquid within said tank to convey solids along the path of said stream; a plurality of drums partially immersed in said liquid across the path of said flow, said drums being mounted in succession therealong for rotation about horizontal axes and each having a perforated side wall portion positioned substantially vertically and partially immersed on the upstream side of its axis, said wall portions being defined by raised edges extending longitudinally across the outer surface of said drums; and means for rotating said drums about said axes in the direction which effects downstream movement of the lowermost portions of said drums, the rotation of said drums being at a peripheral speed less than the speed of said flow, whereby rotation of each of said drums moves its side wall portion from said generally vertical, partially immersed position on the upstream side of the respective drum to a generally horizontal, fully immersed position at the bottom of said drum and then to a generally vertical, partially immersed position on the downstream side of said drum to thereby consecutively restrain, submerge, and discharge solids received on the upstream side of said drum by the respective side wall portions.

7. Cooking apparatus, comprising: a tank; means for causing circulating stream flow of a liquid in said tank to convey a mass of floating solids along the path of said stream; a member mounted across said stream, said member having a generally upright concave restraining surface facing in upstream direction and partially immersed in the path of said stream in substantially transverse relation thereto, said restraining surface having perforations formed therein to permit the passage of said liquid therethrough while preventing the passage of said solids, the upper portion of said restraining surface lying above said liquid level and extending upwardly therefrom in an upstream direction to thereby overlie solids immediately upstream of the point where said surface intersects said liquid level; means defining a second restraining surface; and operating means connected with said member and operable to move said member in a direction to lower said first-mentioned surface with said upper portion moving downwardly upon said last-mentioned solids to thereby entrap and submerge said last-mentioned solids into said liquid, said operating means also being connected with said means defining said second restraining surface and being operable to interpose said second restraining surface across the path of said stream immediately upstream of said first restraining surface and to thereafter move said member to release the solids entrapped by said first restraining surface for movement with said stream.

8. Cooking apparatus, comprising: a tank; means for causing circulating stream flow of a liquid in said tank to convey a mass of floating solids along the path of said stream; a plurality of members mounted across said stream at successive points therealong, each of said members having a generally upright concave restraining surface facing in upstream direction and partially immersed in the path of said stream in substantially transverse relation thereto, said restraining surfaces having perforations formed therein to permit the passage of said liquid therethrough while preventing the passage of said solids, the upper portion of each restraining surface lying above said liquid level and extending upwardly therefrom in an upstream direction to thereby overlie solids immediately upstream of the points where the respective surfaces intersect said liquid level; means defining a plurality of additional restraining surfaces; and operating means connected with said members and operable to move each of said members in a direction to lower said first-mentioned surfaces with the upper portions thereof moving downwardly upon said last-mentioned solids to thereby entrap and submerge said last-mentioned solids into said liquid, said operating means also being connected with said means defining additional restraining surfaces and being operable to interpose said additional restraining surfaces across the path of said stream immediately upstream of the respective first restraining surfaces, said additional operating surfaces thereby preventing solids from passing the respective members, said operating means being operable to thereafter move said members to release said solids entrapped by said first-mentioned restraining surfaces for movement with said stream.

References Cited in the file of this patent
UNITED STATES PATENTS

| | | |
|---|---|---|
| 1,440,663 | Dunn | Jan. 2, 1923 |
| 1,690,104 | Denz | Nov. 6, 1928 |
| 2,207,546 | Lagaard | July 9, 1940 |
| 2,535,905 | Dawson | Dec. 26, 1950 |
| 2,735,357 | Gagnon | Feb. 21, 1956 |